United States Patent Office 3,796,775
Patented Mar. 12, 1974

3,796,775
MOLDING COMPOSITIONS HAVING IMPROVED ENVIRONMENTAL STRESS-CRACK RESISTANCE AND LOW-TEMPERATURE IMPACT STRENGTH
Rudolf Glaser, Ludwigshafen, Juergen Schmidtchen, Frankenthal, and Peter Bauer, Ludwigshafen, Germany, assignors to Badische Anilin- & Soda-Fabrik Aktiengesellschaft, Ludwigshafen (Rhine), Germany
No Drawing. Filed Oct. 22, 1971, Ser. No. 191,770
Claims priority, application Germany, Oct. 29, 1970, P 20 53 067.0
Int. Cl. C08f 37/04
U.S. Cl. 260—897 B
6 Claims

ABSTRACT OF THE DISCLOSURE

Compositions of matter having improved environmental stress-crack resistance and low-temperature impact strength comprising (a) polyethylene, (b) polyisobutylene or ethylene copolymers and (c) N,N'-distearoylethylenediamine. The compositions are used for electrical insulating purposes and the production of moldings.

---

The present invention relates to molding compositions comprising polyethylene, an ethylene copolymer or polyisobutylene and N,N'-distearoylethylenediamine.

Mixtures of polyethylene and a copolymer of ethylene and vinyl acetate are described in U.K. Pat. 1,058,670. These mixtures may contain fillers, oxidation inhibitors, coloring agents and the like. The resistance of these mixtures of environmental stress cracking is appreciably better than that of polyethylene. Moldings made from these molding compositions have however a lower low-temperature impact strength and yield point than moldings made from polyethylene.

It is an object of the present invention to provide molding compositions which have better low-temperature toughness than prior art molding compositions and whose environmental stress-crack resistance is not decreased.

This object is achieved with a molding composition comprising (A) from 85 to 98.4 parts by weight of polyethylene having a density of 0.915 to 0.965 g./cm.³ and a melt index according to ASTM D–1238–65T of from 0.005 to 20 g./10 minutes;
(B) from 1.5 to 10 parts by weight of polyisobutylene having a molecular weight of from 300,000 to 5,000,-000 or an ethylene copolymer containing from 20 to 60% by weight of vinyl acetate units; and
(C) from 0.1 to 5 parts by weight of N,N'-disteroylethylenediamine.

Low or high density polyethylene may be used for the production of the molding compositions. Low density polyethylene having a density of from 0.915 to 0.935 g./cm.³ is particularly suitable. The melt index of the polyethylene (measured according to ASTM D–1238–65T) should be from 0.005 to 20, preferably from 0.05 to 1 g./10 minutes.

The second component of the molding composition according to the invention may be polyisobutylene which has a molecular weight of from 300,000 to 5,000,000 or copolymers of ethylene and vinyl acetate which contain 20 to 60% by weight of vinyl acetate units. The melt index of the copolymers (measured according to ASTM D–1238–65T) should be from 0.5 to 200, preferably from 0.5 to 100 g./10 minutes. 100 parts of the molding composition according to the invention contains from 1.5 to 10, preferably from 2.0 to 5.0, parts by weight of polyisobutylene or the copolymer of ethylene and vinyl acetate.

The second component may however also be a copolymer of ethylene and an acrylate or methacrylate derived from an alcohol having one to eight carbon atoms, the amount of the latter comonomer in the copolymer being from 20 to 60% by weight. In this case 100 parts by weight of the molding composition according to the invention contains from 1.5 to 30, preferably from 4 to 14, parts by weight of the copolymer. The melt index of the copolymers of ethylene and an acrylate or a methacrylate is also from 0.5 to 200 g./10 minutes.

The third component of the molding composition according to the invention is N,N'-distearoylethylenediamine:

(R denoting 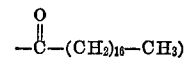

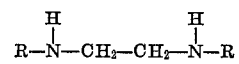

100 parts by weight of the molding composition contains 0.1 to 5 parts by weight, preferably 0.5 to 2.8 parts by weight, of N,N'-distearoylethylenediamine.

The molding compositions according to the invention are prepared by conventional methods, for example by mixing the said three components at temperatures of from 100° to 300° C., preferably from 150° to 200° C., in kneaders, on rollers or in twin-screw or single-screw extruders. It is often advantageous to first of all prepare a mixture of polyisobutylene or an ethylene copolymer and N,N'-distearoylethylenediamine and then to homogenize this mixture with the polyethylene. Batch production is carried out at temperatures of from 80° to 200° C. and the incorporation of the batch into the polyethylene at temperatures of from 120° to 250° C.

The molding compositions in accordance with the invention may contain conventional additives such as coloring agents, polyolefin stabilizers and/or fillers, for example chalk or carbon black.

The molding compositions according to the invention are suitable for the production of moldings, for example tubes, cable sheaths, profiles, hollow articles and injection moldings. The molding compositions may be processed on conventional molding equipment.

The invention is further illustrated by the following examples and comparative examples. The molecular weight of the polyisobutylene is the viscosity-average molecular weight. In all cases 4,4'-thiobis-(3-methyl-6-tertiary-butyl-1-phenol) is used as the heat stabilizer for the polyolefin.

EXAMPLE 1

95.4 parts of polyethylene having a density of 0.918 g./cm.³ and a melt index of 0.18 (190° C./2.16 kg.), 0.1 part of a polyolefin heat stabilizer, 4 parts of a copolymer of 72% by weight of ethylene and 28% by weight of vinyl acetate and 0.5 part of N,N'-distearoylethylenediamine are homogenized in a roller kneader (type: Plastograph, manufactured by Brabender OHG, Duisburg, Germany) running at a speed of 125 r.p.m. at a temperature of 154° C. The homogeneous mixture is then kneaded for one hour under the said conditions. Sheets having a thickness of 3 mm. are compression molded which are then quench cooled and conditioned at 70° C. for eighteen hours. Specimens are prepared from the compression molded sheets according to ASTM D–1693–65T and tested. In modification of the ASTM test procedure, the concentration of the wetting agent is 10%.

In the stress-crack resistance test according to ASTM D-1693-65T no failures can be detected after one thousand hours.

COMPARATIVE EXAMPLE 1

Specimens are prepared by the procedure described in Example 1 from 91.9 parts of polyethylene having a density of 0.918 g./cm.$^3$ and a melt index of 0.18 (190° C./2.16 kg.), 0.1 part of a polyolefin heat stabilizer and 8 parts of a copolymer of 72% by weight of ethylene and 28% by weight of vinyl acetate and tested for stress-crack resistance as in Example 1. 50% of the specimens fail after four hours.

COMPARATIVE EXAMPLE 2

Specimens are prepared by the procedure described in Example 1 from 98.9 parts of polyethylene which has a density of 0.918 g./cm.$^3$ and a melt index of 0.18 (190° C./2.16 kg.), 0.1 part of polyolefin heat stabilizer and 1 part of N,N'-distearoylethylenediamine and tested for stress-crack resistance as described in Example 1. 50% of the specimens fail after 2½ hours.

EXAMPLE 2

Specimens are prepared by the procedure described in Example 1 from 96.9 parts of polyethylene which has a density of 0.918 g./cm.$^3$ and a melt index of 0.18 (190° C./2.16 kg.), 0.1 part of a polyolefin heat stabilizer, 2 parts of an ethylene copolymer which contains 40% by weight of vinyl acetate units, and 1 part by weight of N,N'-distearoylethylenediamine and tested for stress-crack resistance as described in Example 1 in modification of the ASTM test procedure. No failures can be detected after one thousand hours.

COMPARATIVE EXAMPLE 3

Specimens are prepared by the procedure described in Example 1 from 97.9 parts of polyethylene having a density of 0.918 g./cm.$^3$ and a melt index of 0.18 (190° C./2.16 kg.), 0.1 part of a polyolefin heat stabilizer and 2 parts of N,N'-distearoylethylenediamine and tested for stress-crack resistance as described in Example 1. 50% of the specimens fail after twenty hours.

COMPARATIVE EXAMPLE 4

Specimens are prepared by the procedure described in Example 1 from 95.9 parts of polyethylene having a density of 0.918 g./cm.$^3$ and a melt index of 0.18 (190° C./2.16 kg.), 0.1 part of polyolefin heat stabilizer and 4 parts of a copolymer consisting of 60% by weight of ethylene and 40% by weight of vinyl acetate. These specimens are tested for stress-crack resistance as described in Example 1. 50% of the specimens fail after twelve hours.

EXAMPLE 3

Specimens are prepared by the procedure described in Example 1 from 95.4 parts of polyethylene having a density of 0.918 g./cm.$^3$ and a melt index of 0.18 (190° C./2.16 kg.), 0.1 part of a polyolefin heat stabilizer, 3.5 parts of polyisobutylene having a molecular weight of 1,000,000 and 1 part of N,N'-distearoylethylenediamine and tested for stress-crack resistance. No failures can be detected even after one thousand hours.

COMPARATIVE EXAMPLE 5

Specimens are prepared by the procedure described in Example 1 from 92.9 parts of polyethylene having a density of 0.918 g./cm.$^3$ and a melt index of 0.18 (190° C./2.16 kg.), 0.1 part of a polyolefin heat stabilizer and 7 parts of polyisobutylene having a molecular weight of 1,000,000 and tested for stress-crack resistance. 50% of the specimens fail after one hour.

COMPARATIVE EXAMPLE 6

Specimens are prepared by the procedure described in Example 1 from 95.5 parts of polyethylene having a density of 0.918 g./cm.$^3$ and a melt index of 0.18 (190° C./2.16 kg.), 0.1 part of a polyolefin heat stabilizer, 3.5 parts of polyisobutylene having a molecular weight of 1,000,000 and 1 part of stearyl ethylamide and tested for stress-crack resistance. 50% of the specimens fail after thirty minutes.

COMPARATIVE EXAMPLE 7

Specimens are prepared by the procedure described in Example 1 from 95.4 parts of polyethylene having a density of 0.918 g./cm.$^3$ and a melt index of 0.18 (190° C./2.16 kg.), 0.1 part of a polyolefin heat stabilizer, 3.5 parts of polyisobutylene having a molecular weight of 1,000,000 and 1 part of N,N'-dipalmitoylethylenediamine and tested for stress-crack resistance. 50% of the specimens fail after three hours.

COMPARATIVE EXAMPLE 8

Specimens are prepared by the procedure described in Example 1 from 95.4 parts of polyethylene having a density of 0.918 g./cm.$^3$ and a melt index of 0.18 (190° C./2.16 kg.), 0.1 part of a polyolefin heat stabilizer, 3.5 parts of polyisobutylene having a molecular weight of 1,000,000 and 1 part of stearamide and tested for stress-crack resistance. 50% of the specimens fail after one hour.

COMPARATIVE EXAMPLE 9

Specimens are prepared by the procedure described in Example 1 from 91.9 parts of polyethylene having a density of 0.918 g./cm.$^3$ and a melt index of 0.18 (190° C./2.16 kg.), 0.1 part of a polyolefin heat stabilizer and 8 parts of an ethylene copolymer containing 40% by weight of vinyl acetate units and having a melt index of 42 g./10 minutes and tested for stress-crack resistance. No failures can be detected after 1000 hours. In the test for low-temperature impact strength according to ASTM D-746-65T at —76° C. 60% of the specimens fail. The yield point according to DIN 53,455 is 85 kg./cm.$^2$. By contrast, specimens made from molding compositions according to the invention as described in Examples 1 to 3 do not fail under the same conditions and have a yield point according to DIN 53,455 of from 91 to 95 kg./cm.$^2$.

COMPARATIVE EXAMPLE 10

Specimens are prepared by the procedure described in Example 1 from 81.9 parts of polyethylene having a density of 0.918 g./cm.$^3$ and a melt index of 0.18 (190° C./2.16 kg.), 0.1 part of a polyolefin heat stabilizer and 18 parts of a polyisobutylene having a molecular weight of 1,000,000 and tested for stress-crack resistance. No failures can be detected after one thousand hours. In the test for low-temperature impact strength according to ASTM D-746-65T at —76° C. 40% of the specimens fail. The yield point according to DIN 53,455 is 68 kg./cm.$^2$.

COMPARATIVE EXAMPLE 11

Specimens are prepared by the procedure described in Example 1 from 99.9 parts of polyethylene having a density of 0.918 g./cm.$^3$ and a melt index of 0.18 (190° C./2.16 kg.) and 0.1 part of a polyolefin heat stabilizer and tested for stress-crack resistance. All of the specimens fail after thirty minutes. None of the specimens fail in the test for low-temperature impact strength according to ASTM D-746-65T at —76° C. The yield point according to DIN 53,455 is 96 kg./cm.$^2$.

As the examples and comparative example show, it is surprising that by adding N,N'-distearoylethylenediamine to mixtures of polyethylene and polyisobutylene or copolymers of ethylene and vinyl acetate a molding composition is obtained which has a low temperature impact strength comparable with that of pure polyethylene and whose resistance to environmental stress cracking is not lower than that of prior art molding compositions comprising polyethylene and a copolymer of ethylene and vinyl acetate. Molding compositions of polyethylene with polyisobutylene or with copolymers of ethylene and vinyl acetate which contain an addition of N,N'-distearoylethylenediamine according to the invention also exhibit only a very slight drop in the yield point. Comparative Examples 6, 7 and 8 show that it is not possible to obtain the surprising effect achieved in accordance with the invention by adding stearyl ethylamide, stearamide or N,N'-dipalmitoylethylenediamine to prior art molding compositions comprising polyethylene and polyisobutylene or copolymers of ethylene and vinyl acetate.

We claim:
1. A composition of matter having improved environmental stress-crack resistance and low-temperature impact strength comprising per one hundred parts by weight
   (A) 85 to 98.4 parts by weight of polyethylene having a density of from 0.915 to 0.965 g./cm.$^3$ and a melt index according to ASTM D-1238-65T of from 0.005 to 20 g./10 minutes;
   (B) 1.5 to 10 parts by weight of a copolymer of ethylene containing from 20 to 60% by weight of vinyl acetate units and having a melt index according to ASTM D-1238-65T of from 0.5 to 200 g./10 minutes; and
   (C) 0.1 to 5 parts by weight of N,N'-distearoylethylenediamine.

2. A composition as claimed in claim 1, the polyethylene of (A) having a melt index according to ASTM D-1238-65T of from 0.05 to 1 g./10 minutes.

3. A composition as claimed in claim 1, the amount of said N,N'-distearoylethylenediamine being 0.5 to 2.8 parts by weight.

4. A composition as claimed in claim 1, said copolymer having a melt index according to ASTM D-1238-65T of from 0.5 to 100 g./10 minutes.

5. A composition as claimed in claim 4, the amount of said copolymer being 2.0 to 5.0 parts by weight.

6. A composition as claimed in claim 5, the amount of said N,N'-distearoylethylenediamine being 0.5 to 2.8 parts by weight.

References Cited

UNITED STATES PATENTS

| 3,182,101 | 5/1965 | Rees | 260—897 B |
| 3,230,190 | 1/1966 | Moulton et al. | 260—23 H |

FOREIGN PATENTS

| 1,058,670 | 2/1967 | Great Britain | 260—897 B |

MURRAY TILLMAN, Primary Examiner

J. ZIEGLER, Assistant Examiner

U.S. Cl. X.R.

161—216; 260—45.9 R, 897 A